United States Patent [19]
Agari

[11] Patent Number: 5,360,271
[45] Date of Patent: Nov. 1, 1994

[54] UNDER SEAL DEVICE FOR A LINEAR MOTION GUIDE UNIT

[75] Inventor: Norimasa Agari, Seki, Japan

[73] Assignee: Nippon Thompson Co., Ltd., Tokyo, Japan

[21] Appl. No.: 995,413

[22] Filed: Dec. 18, 1992

[30] Foreign Application Priority Data

Dec. 18, 1991 [JP] Japan .................................. 3-353169

[51] Int. Cl.⁵ .................. F16C 29/08; F16C 33/72
[52] U.S. Cl. ............................................. 384/15; 384/43
[58] Field of Search ................... 384/43, 44, 45, 15

[56] References Cited

U.S. PATENT DOCUMENTS

| 4,854,741 | 8/1989 | Mottate et al. ............... 384/45 |
| 4,921,358 | 5/1990 | Kasuga et al. ............... 384/15 |
| 5,087,130 | 2/1992 | Tsukada ....................... 384/15 |

FOREIGN PATENT DOCUMENTS

| 0164540 | 4/1985 | European Pat. Off. . |
| 0318980 | 6/1989 | European Pat. Off. . |
| 0390156 | 3/1990 | European Pat. Off. . |
| 1299462 | 9/1961 | France . |
| 2442374 | 11/1979 | France . |
| 2521663 | 2/1983 | France . |
| 90114442 | 11/1990 | Germany . |
| 611717 | 1/1986 | Japan . |
| 1112021 | 4/1989 | Japan . |
| 675011 | 8/1990 | Switzerland . |
| 2021706 | 5/1978 | United Kingdom . |

Primary Examiner—Daniel P. Stodola
Assistant Examiner—John Q. Nguyen
Attorney, Agent, or Firm—Browdy and Neimark

[57] ABSTRACT

The linear motion rolling guide unit has the under seals (13) mounted to the end seals (19) by fitting the engagement portions (30) formed at the longitudinal ends of the under seal (13) into the engagement holes (24) formed in the end seals (19). The under seal (13) consists of an underside core member (27) having the engagement portions (30) and a resilient underside member (28) having lip portions (25, 26). Since the under seal (13) is not fixed to the casing (2) and the end caps (5), the under seal (13) will not easily deform or strain. Therefore, the under seals (13) attached to the end seals can seal the sliding surfaces very well.

16 Claims, 3 Drawing Sheets

UNDER SEAL DEVICE FOR A LINEAR MOTION GUIDE UNIT

BACKGROUND OF THE INVENTION

1. Field of the Invention

The present invention relates to a linear motion rolling guide unit which is applied to sliding portions of machining tools, precision processing equipment and testing equipment and which consists of a track rail with raceway grooves formed longitudinally extending on both side walls thereof, a casing straddling the track rail and having raceway grooves, and a number of rolling elements that roll between the facing raceway grooves.

2. Description of the Prior Art

In a conventional linear motion rolling guide unit, when a slider sides on a track rail (simply referred to as a rail), the seal between the slider and the rail is provided by end seals mounted at both ends of the slider and an under seal mounted to the underside of the slider.

A linear motion rolling guide unit as shown in FIG. 5 has been disclosed. FIG. 5 is a perspective view showing one example of a conventional linear motion rolling guide unit. As shown in the figure, the linear motion rolling guide unit consists mainly of a rail 1 with raceway grooves 9 formed longitudinally extending on both side walls thereof and a slider 20 slidably mounted astride the rail 1. The slider 20 is slidable relative to the rail 1 and consists of a casing 2 having raceway grooves 8 at positions facing the raceway grooves 9, a number of rolling elements or balls 4, which are trapped between the opposing raceway grooves 8, 9 to allow relative motion between the rail and the casing, and end caps 5 attached to the longitudinal ends of the casing 2, the longitudinal direction being the same as the sliding direction of the casing.

The end cap 5 is fitted with an end seal 19 that provides a seal between the rail 1 and the slider 20. The end cap 5 also has a grease nipple 18 for supplying lubricant to the sliding surface between the rail 1 and the slider 20. To prevent the balls 4 from coming off the casing 2, a ball retaining band 17 is fitted into the casing 2 so as to enclose the balls 4. The casing 2 is attached with a retainer plate 3 to reliably prevent the balls 4 from coming off the casing 2 and to seal the casing 2, the longitudinal side walls 11 of the rail 1 and the underside of the casing 2.

The slider 20 is mounted astride the rail 1 and is freely slidable on the rail because of the rolling elements 4 made up of a number of balls that circulate along the raceway grooves 9 of the rail 1. That is, the rolling elements 4 in a load region, i.e., those traveling in the raceway groove 9 of the rail 1 are led into a direction changing path which is formed in the end cap 5 and further into a return path 36 formed parallel to the raceway groove 8 in the upper part of the casing 2, so that the rolling elements 4 circulate in an endless raceway. As the balls 4 trapped between the raceway groove 8 formed in the slider 20 and the raceway groove 9 formed in the rail 1 turn under load, the slider 20 can freely move relative to the rail 1.

The retainer plate 3 is simple in shape and thus can be manufactured easily. However, the retainer plate 3 has the drawback of being easily deformed by external force when there are positioning errors of the casing 2 and the rail 1 because it is formed of a thin plate. To describe in more detail, when the slider 20 slides on the rail 1, any temperature variations and swelling by lubricant of the retainer plate 3 will deform the retainer plate 3 itself degrading its sealing performance. Further, the balls 4, the rolling elements, may make contact with the retainer plate 3, increasing the sliding resistance. Another drawback is that when the slider 20 is taken from the rail 1, the balls 4 may fall from the slider.

As a means for retaining the balls, a structure has been developed which provides a ball retaining portion to a member having a raceway groove. In a construction where the raceway groove is formed directly in the side walls of the casing, however, the retaining portion on the lower side of the raceway groove becomes an obstacle making it difficult to insert a whetstone in the raceway groove to form a raceway surface in the casing.

A retainer for the linear motion rolling guide unit that solves this problem is disclosed in the Japanese Patent Laid-Open No. 112021/1989. How the balls are retained in the linear motion rolling guide unit will be explained by referring to FIGS. 6 and 7. FIG. 6 is a cross section of an example of the conventional linear motion rolling guide unit and FIG. 7 a perspective view showing one example of the retainer plate incorporated in FIG. 6. The linear motion rolling guide unit shown in FIGS. 6 and 7 has basically the same construction and function as those of the linear motion rolling guide unit of FIG. 5 and thus identical parts are given like reference numerals.

As shown in FIGS. 6 and 7, the retainer plate 3 in the linear motion rolling guide unit consists of a sealing portion 7 protruding like a lip, a sealing portion 10 having its upper surface as a sealing surface, and a retaining portion 6 for sustaining the rolling elements in the raceway grooves, all integrally formed of the same material. In the linear motion rolling guide unit, the retainer plate 3 is put in contact with underside 12 of the casing 2 and secured thereto by screwing a screw 16 through a through-hole 15 of the retainer plate 3 and into the threaded hole in the casing 2. In this linear motion rolling guide unit, the balls 4 are kept in the casing 2 by installing them in the raceway groove 8 of the casing 2 and holding them against the raceway groove 8 by the retaining portion 6 arranged along the wall surface 22 of the casing 2 on the bottom side of the raceway groove 8 and by a retaining band 17 fixed at both ends of the casing 2. The distance between the upper edge 23 of the raceway groove 8 of the casing 2 and the top edge 14 of the retaining portion 6 of the retainer plate 3 is set larger than the diameter of the ball 4 so that the balls 4 can be fitted into the raceway groove 8. The distance between the retaining band 17 and the top edge 14 of the retaining portion 6 is set smaller than the ball diameter.

The raceway grooves 9, 8 of the rail 1 and the casing 2 are formed like a letter V, and the raceway surfaces are formed by arc surfaces to make the load capacity larger than that of flat surfaces. At the upper end surface of the raceway groove 8 in the casing 2 is formed a retaining portion 6 that projects toward the rail 1 beyond the vertical line passing the center of the ball 4. The lower end surface of the raceway groove 8 which faces the upper end surface is formed retracted from the vertical ball center line toward the casing side.

The retainer plate 3 consists of a sealing portion 7 formed as a seal lip, a sealing portion 10 that fits tightly onto the underside 12 of the casing 2, and a retaining portion 6 for holding the ball 4. The retainer plate 3 is made of such a material as plastics that has enough resiliency to provide a sealing function and also a certain level of rigidity to retain the balls 4 in the raceway groove. The retainer plate 3 can be formed by injection molding as one piece consisting of a sealing portion 7, a sealing portion 10 and a retaining portion 6.

However, with the above-mentioned linear motion rolling guide unit, since the retainer plate 3 is secured at both ends to the metal casing 2 by screws 16 and hence cannot be moved relative to the casing 2, the retainer plate 3 formed of plastics such as synthetic resin will be deformed after it is swelled by lubricating oil over a long period of use. Once the retainer plate 3 is deformed, the sealing contact condition between the underside 12 of the casing 2 and the upper surface 21 of the retainer plate 3 deteriorates. The sealing portion 7 may also deform, degrading the contact condition between the sealing portion 7 and the side surface 11 of the rail 1, lowering the sealing performance of the linear motion rolling guide unit, particularly the dust-sealing effect. At the same time, the retaining portion 6 that retains the balls 4 may also deform increasing the gap between the top edge 14 of the retaining portion 6 and the retaining band 17, so that when the slide unit is taken off the rail, the balls may not be able to be contained in the casing 2 any longer because of their own weight and may fall from the casing 2.

The Japanese Utility Model Laid-Open No. 1717/1986 discloses a linear guide equipment. This linear guide apparatus consists of: a long rail having a plurality of grooves for rolling elements formed axially therein; a slide with a pair of arms which is shaped like a saddle and has rolling element grooves facing the corresponding rolling element grooves formed in the rail; a number of rolling elements that rotate trapped between the groove in the rail and the groove in the slider; end caps mounted to both ends of the slider to form a circulating path for the rolling elements and to prevent dust from entering the rolling element portion from the ends of the slider; and dust-prevention members longer than the arms of the slider and arranged at the underside of the arms, the dust-prevention members being supported at both ends by the end caps, with one of their side edges placed in contact with the sides of the rail to prevent dust from entering the rolling element portion from below.

With the above linear guide equipment, however, the dust-prevention members arranged at the underside of the arms are supported by the end caps. Since the dust-prevention members and the end caps are made of different materials, they generally have different thermal expansions caused by temperature changes. Therefore, if the thermal expansion of the dust-prevention members is larger than that of the end caps, a deflection occurs in the dust-prevention members, causing a gap between it and the rail or between it and the underside of the arms, which in turn deteriorates the sealing effect. As a result, dust can no longer be prevented from entering the interior of the linear guide equipment.

SUMMARY OF THE INVENTION

A primary object of this invention is to solve the above-mentioned problems and to provide a linear motion rolling guide unit, which is characterized in: that an under seal for sealing the side walls of the track rail (simply referred to as a rail) and the undersides of the casing and the end caps is fitted to end seals mounted to the end surfaces of the end caps in such a way that the under seal can move relative to the metal casing when the resilient, plastic underside member of the under seal is swelled by lubricating oil, thereby preventing buckling, bending or other deformations of the under seal while at the same time preventing the under seal from being strained, buckled or deformed otherwise by thermal expansion when there are temperature variations; that a good sealing effect is provided at all times for the casing and the end caps; and that the under seal can easily be mounted and dismounted.

Another object of this invention is to provide a linear motion rolling guide unit, which consists of: a rail having rail raceway grooves formed longitudinally extending on both side walls thereof; a casing slidable relative to the rail, the casing having casing raceway grooves formed therein at positions facing the rail raceway grooves; end caps mounted to each longitudinal end of the casing; end seals placed in contact with the end caps; a number of rolling elements trapped between the opposing raceway grooves and turned to circulate in an endless path; and under seals having a first lip portion and a second lip portion, the first lip portion being able to make hermetic contact with the undersides of the casing and the end caps, the second lip portion being able to make hermetic contact with the side walls of the rail, the under seals having engagement portions formed at both longitudinal ends thereof, the engagement portions being inserted into engagement holes formed in the end seals to mount the under seal to the end seals.

In this linear motion rolling guide unit, the under seal consists of an underside core member having the engagement portions and a resilient underside member having the lip portions secured to the underside core member; and the end seal consists of an end core member having the engagement hole formed therein and a resilient end member secured to the end core member.

In the linear motion rolling guide unit, the under seal has two lip portions, one in hermetical contact with the undersides of the casing and the end caps and the other in hermetical contact with side walls of the rail below the raceway grooves. The engagement portions formed at both the longitudinal ends of the under seal are fitted into the engagement holes of the end seals to mount the under seal to the end seals so that the under seal is allowed to move in the longitudinal direction when the under seal expands or contracts by thermal expansion due to temperature variations or as a result of swelling by lubricant, thus preventing buckling, straining or other deformation of the under seal.

With this linear motion rolling guide unit, the lip portions of the under seal are always kept in hermetical contact with the underside of the casing and with the sides of the rail, maintaining a good sealing condition. That is, the first lip portion of the under seal can move relative to the end caps and the casing while maintaining the hermetical contact with them, assuring the good sealing performance. The second lip portion of the under seal also can move relative to the side walls of the rail while in hermetical contact with them, thereby assuring a good sealing performance. This means that a good seal can be provided at all times for the sliding surface between the rail and the slider, preventing foreign substances such as dust, dirt or water from adhering to the sliding surface and improving the dust-proof capability. Since the under seal is formed separate from the casing, the raceway grooves can easily be cut in the casing, permitting high precision machining of the raceway grooves and substantially improving the bearing performance of the linear motion rolling guide unit.

Another feature of the linear motion rolling guide unit is that the under seal consists of an underside core member having the engagement portions and a resilient underside member having the lip portions secured to the underside core member, and that the end seals each consist of an end core member having the engagement hole and a resilient end member secured to the end core member. Because of this construction, once the position of the engagement hole in the end seal is accurately set, the engagement portions of the under seal can easily be fitted into the engagement holes without having to position the under seal with respect to the casing and the end caps, thus making the mounting work very simple. The under seal, therefore, can always seal the gap between the rail, the casing and the end caps very well, preventing foreign substances such as dust from adhering to the sliding surface of the guide unit.

Furthermore, in this linear motion rolling guide unit, since the under seal can very easily be attached to or detached from the end seals, the assembly performance is greatly improved. Even after the under seal is fitted to the side seals, it can easily be detached from the end seals, facilitating maintenance and inspection of the guide unit or deletion and modification of options. This eliminates the need to tap threaded holes in the casing of the slider, as required by the conventional guide units, when mounting the under seal to the slider. This invention therefore greatly reduces the manufacturing cost.

DETAILED DESCRIPTION OF EMBODIMENTS

Figure 1:
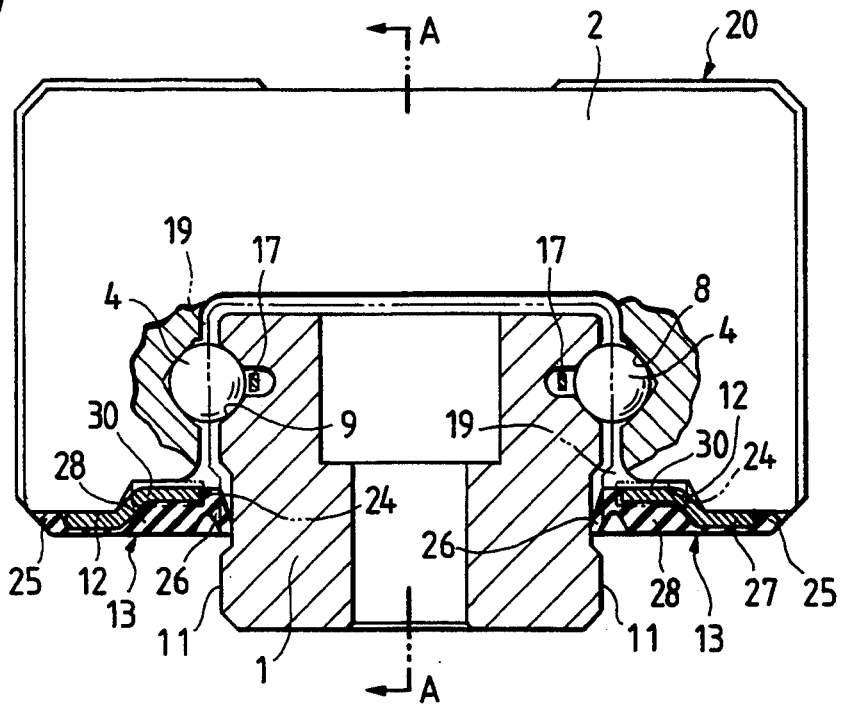
FIG. 1 is a cross section of the linear motion rolling guide unit as one embodiment of this invention.

Now, by referring to the accompanying drawings, one embodiment of the linear motion rolling guide unit according to this invention will be described. In FIGS. 1 to 4, parts that have the same functions as those of FIG. 5 are given like reference numerals.

Figure 5:
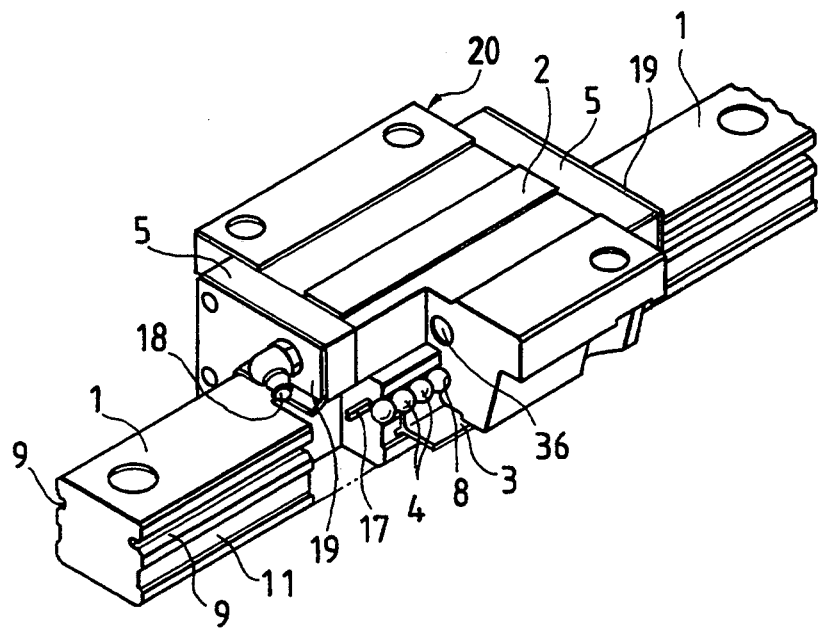
FIG. 5 is a partially cutaway perspective view showing an example of the conventional linear motion rolling guide unit.
Figure 6:
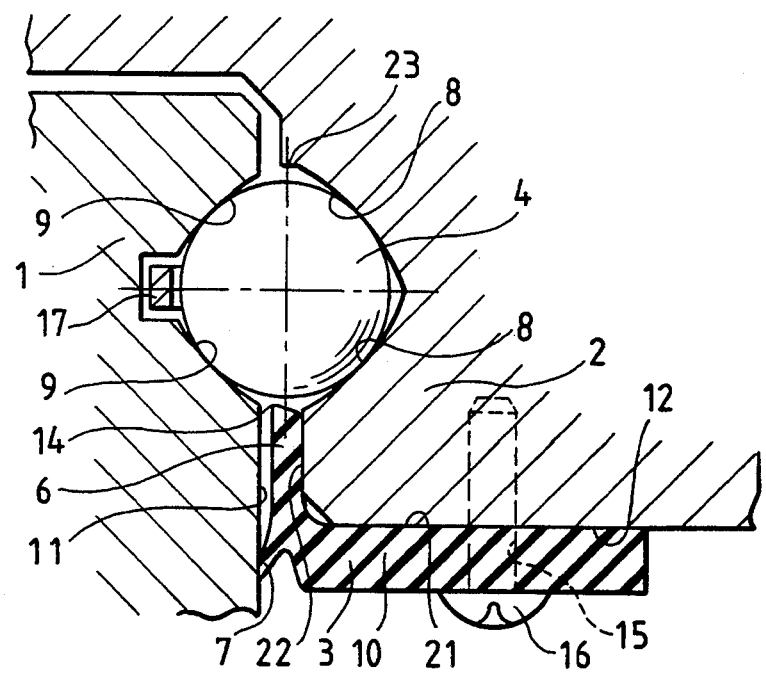
FIG. 6 is a cross section showing another example of the conventional linear motion rolling guide unit.
Figure 7:
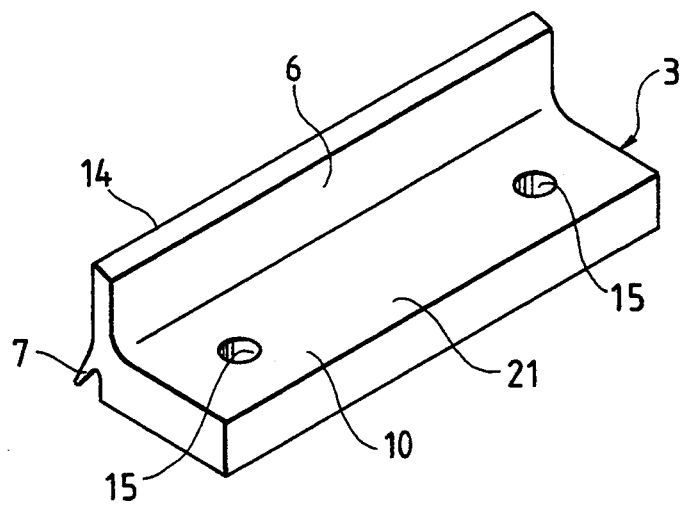
FIG. 7 is a perspective view of a retainer plate incorporated into the structure of FIG. 6.

The linear motion rolling guide unit of this invention has basically the same construction as that shown in FIG. 5 but is characterized in that it has an under seal 13. The linear motion rolling guide unit of this invention consists of a track rail (simply referred to as a rail) 1 having raceway grooves 9 formed longitudinally extending on side walls 11, similar to those shown in FIG. 5, and a slider 20 slidable mounted on the rail 1. The slider 20 is slidable relative to the rail 1 and consists of: a casing 2 having raceway grooves 8 at positions facing the raceway grooves 9; a number of rolling elements 4 trapped between the opposing raceway grooves 8 and 9 to allow relative motion between the casing and the rail; end caps 5 mounted to the longitudinal ends of the casing 2; end seals 19 attached to the ends of the end caps 5; and under seals 13 attached to the end seals 19.

Figure 2:
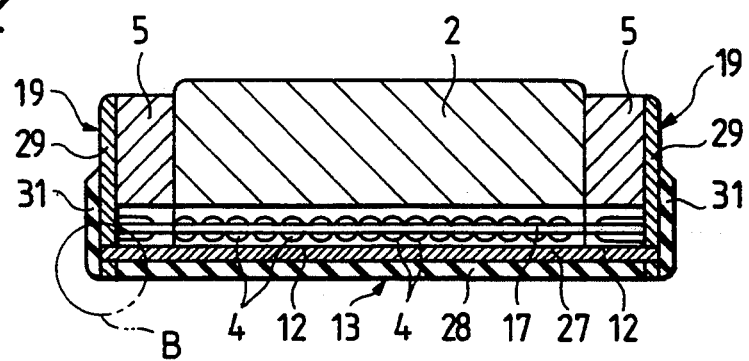
FIG. 2 is a cross section taken along the line A—A of FIG. 1.
Figure 3:
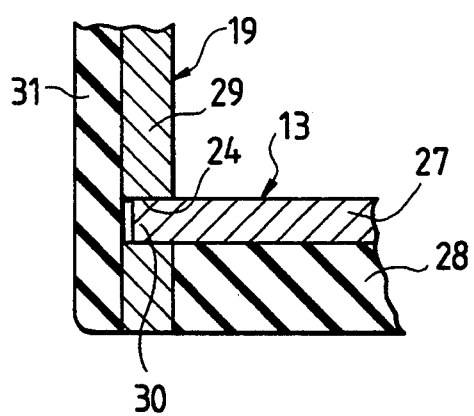
FIG. 3 is an enlarged cross section of a connecting portion B of FIG. 2 between the under seal and the end seal.
Figure 4:
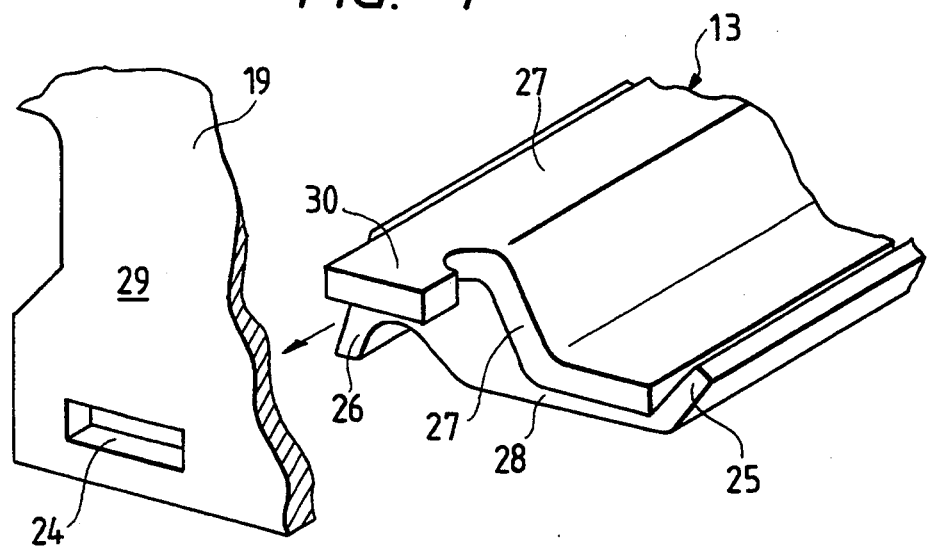
FIG. 4 is a perspective view of the connecting portion of the under seal and the end seal, disassembled.

FIG. 2 shows the end caps 5 incorporated in the linear motion rolling guide unit and the under seal 13 removably mounted to the end caps 5. FIG. 3 is an enlarged cross section of the end seal 19 and the under seal 13 to clearly reveal the essential portion of this invention.

The end caps 5 are mounted to the ends of the casing 2 by fastening screws into mounting holes. The end caps 5 are each formed on their inner side with a direction changing path, in which the balls 4 circulating along the raceway surface between the casing 2 and the rail 1 change their direction of travel. The end caps 5 are each formed with a rail accommodating recess into which the rail 1 is passed.

In this linear motion rolling guide unit, the end seal 19 mounted to the end surface of the end cap 5 has its end core member 29 formed with an engagement hole 24 to allow the under seal 13 to be mounted to the end seal 19. The under seal 13 has its underside core member 27 formed with an engagement portion 30 that projects from both ends of the core member 27. The under seal 13 has a lip portion 25 and another lip portion 26. The first lip portion 25 is hermetically engageable with the underside 12 of the casing 2 and the end cap 5. The second lip portion 26 is also hermetically engageable with the wall 11 of the rail 1 below the raceway groove 9. The engagement portions 30 formed at the longitudinal ends of the under seal 13 are fitted into the engagement holes 24 in the end seals 19, thus securing the under seal 13 to the end seals 19.

The under seal 13 consists of the underside core member 27 made of metallic material such as steel that has the engagement portion 30; and a resilient underside member 28 formed of rubber or plastics which has its lip portions 25, 26 fused to the underside core member 27. The end seal 19 consists of the end core member 29 formed with the engagement hole 24; and a resilient end member 31 formed of rubber or plastics fused to the end core member 29. The resilient underside member 28 of the under seal 13 and the resilient end member 31 of the end seal 19 may have their peripheral portions overlapped or fused together to ensure a complete seal of their boundary area.

Therefore, the fixing of the under seal 13 to the end seal 19 is achieved by disconnectably engaging the underside core member 27 and the end core member 29. The hermetical seal among the under seal 13, the casing 2 and the rail 1 is achieved by the resilient underside member 28 that has the lip portions 25, 26. The seal between the end seal 19 and the rail 1 is provided by the resilient end member 31.

In this linear motion rolling guide unit, since the under seal 13 is mounted to the end seal 19 by inserting the engagement portion 30 of the under seal 13 into the engagement hole 24 of the end seal 19, the under seal 13 can move longitudinally relative to the casing 2 and the end caps 5 on each side when it is deformed by thermal expansion. The under seal 13 and the end seal 19 may be formed of the same sealing material or different materials.

Further, since the under seal 13 is removably attached to the end seal 19 and not secured to the casing 2 or the end cap 5, the under seal 13 will not deform or buckle because of differences in thermal expansion between it and the casing 2 and the end cap 5 when there are temperature variations. Hence, the under seal 13 can always have its lip portion 25 in hermetical contact with the underside of the casing 2 and the end cap 5, and its second lip 26 in hermetical contact with the wall 11 of the rail 1, thus providing a good sealing performance.

What is claimed is:

1. A linear motion rolling guide unit which consists of:
   a track rail having rail raceway grooves formed longitudinally extending on both side walls thereof;
   a casing straddling the track rail and being able to slide relative to the track rail, the casing having casing raceway grooves formed therein at positions facing the rail raceway grooves;
   an end cap mounted to each longitudinal end of the casing;
   an end seal made of metal and placed in contact with each end cap;
   under seals mounted to undersides of the casing and the end caps; and
   rolling elements trapped between the rail raceway grooves and the casing raceway grooves and turned to circulate in an endless path;
   the under seals each having an underside core member made of metal and a resilient underside member made of non-metallic material and secured to the underside core member, the underside core member having engagement portions at longitudinal ends thereof, and the resilient underside member having a width greater than the width of the underside core member and a first lip portion which makes a hermetical contact with the undersides of the casing and the end caps and a second lip portion which makes a hermetical contact with the side walls of the track rail, said first lip portion being spaced apart from said second lip portion by the underside core member therebetween, said underside core member being enclosed by said resilient underside member against said guide unit; and
   the end seals each having an end core member made of metal and a resilient end member made of non-metallic material and secured to the end core member, and the end core member having an engagement hole into which the corresponding engagement portion of the underside core member is fitted;
   whereby the engagement portions of the underside core members are fitted into the engagement holes of the end core members to mount the under seals to the end seals.

2. The linear motion rolling guide unit as claimed in claim 1, wherein each under seal is engaged to the casing and the end caps.

3. The linear motion rolling guide unit as claimed in claim 1, wherein the engagement holes of the end core members are so positioned and formed in the end core members that, with the engagement portions of the underside core member fitted into the engagement holes of the end core members, the first lip portion makes a hermetical contact with the undersides of the casing and the end caps and the second lip portion makes a hermetical contact with the side walls of the track rail.

4. The linear motion rolling guide unit as claimed in claim 1, wherein the resilient underside member of the under seal is fused and secured to the underside core member.

5. The linear motion rolling guide unit as claimed in claim 1, wherein each resilient underside member of each under seal is secured to the under surface of each underside core member.

6. The linear motion rolling guide unit as claimed in claim 1, wherein the engagement portions of the underside core member are protrusions projecting from the longitudinal ends thereof.

7. The linear motion rolling guide unit as claimed in claim 1, wherein each resilient underside member is made of plastics.

8. The linear motion rolling guide unit as claimed in claim 1, wherein each resilient underside member is made of rubber.

9. The linear motion rolling guide unit as claimed in claim 1, wherein the resilient end member of the end seal is fused and secured to the end core member.

10. The linear motion rolling guide unit as claimed in claim 1, wherein each resilient end member of each end seal is secured to a lower part of the end core member.

11. The linear motion rolling guide unit device as claimed in claim 1, wherein each resilient end member is made of plastics.

12. The linear motion rolling guide unit as claimed in claim 1, wherein each resilient end member is made of rubber.

13. The linear motion rolling guide unit as claimed in claim 1, wherein the underside core members and the end core members are made of the same metal material.

14. The linear motion rolling guide unit as claimed in claim 1, wherein the resilient underside members of the under seals and the resilient end members of the end seals are overlapped at their circumferential edges of ensure a reliable seal at their boundary.

15. The linear motion rolling guide unit as claimed in claim 1, wherein the sealing condition among the under seals, the casing, the end caps and the track rail is achieved by the first and second lip portions of the resilient underside member.

16. The linear motion rolling guide unit as claimed in claim 1, wherein the sealing condition between the end seal and the track rail is achieved by the resilient end member.

* * * * *